United States Patent
Lee et al.

(10) Patent No.: US 12,132,618 B2
(45) Date of Patent: Oct. 29, 2024

(54) ARTIFICIAL INTELLIGENCE OF THINGS (AIoT) DEVELOPMENT SYSTEM AND WEARABLE DEVICE HAVING THE SAME

(71) Applicant: Your health technology Co., Ltd., Tainan (TW)

(72) Inventors: Shuenn-Yuh Lee, Tainan (TW); Chieh Tsou, Kaohsiung (TW)

(73) Assignee: YOUR HEALTH TECHNOLOGY CO., LTD., Tainan (TW)

( * ) Notice: Subject to any disclaimer, the term of this patent is extended or adjusted under 35 U.S.C. 154(b) by 821 days.

(21) Appl. No.: 17/336,014

(22) Filed: Jun. 1, 2021

(65) Prior Publication Data
US 2021/0409286 A1 Dec. 30, 2021

(30) Foreign Application Priority Data
Jun. 24, 2020 (TW) .................. 109121694

(51) Int. Cl.
*H04L 41/16* (2022.01)
*G06F 1/16* (2006.01)
*G06F 15/02* (2006.01)
*G06F 15/78* (2006.01)
*G16Y 20/20* (2020.01)
(Continued)

(52) U.S. Cl.
CPC ............. *H04L 41/16* (2013.01); *G06F 1/163* (2013.01); *G06F 15/0208* (2013.01); *G06F 15/7817* (2013.01); *G05B 2219/25085* (2013.01)

(58) Field of Classification Search
CPC .................. G06N 20/00; H04L 67/12
See application file for complete search history.

(56) References Cited

U.S. PATENT DOCUMENTS 10,142,491 B1 * 11/2018 Chandrashekar .... G06Q 20/145
2020/0374149 A1 * 11/2020 Bernal Barros ........ H04L 67/12
(Continued)

FOREIGN PATENT DOCUMENTS

CN 105187537 A 12/2015

OTHER PUBLICATIONS

Official Action issued by Taiwan Intellectual Property Office on Mar. 3, 2021.

*Primary Examiner* — Getente A Yimer
(74) *Attorney, Agent, or Firm* — Chun-Ming Shih; LANWAY IPR SERVICES

(57) ABSTRACT

The present invention provides an AIoT development system. The present invention includes: an auxiliary device having an AI edge computing processing function, a core, and a plurality of function expansion kits. The core includes: a processing unit having programmable, computing and AI communication functions; and a plurality of expansion interfaces for performing signal transmission with an external device. Each of the function expansion kits includes: a relay interface connected to the expansion interfaces of the core, a transducer for sensing signals from a test object located at where a corresponding one of the function expansion kits is, and a function circuit for processing the signals sensed by the transducer. The transducer of each of the function expansion kits senses signals, or modulates the sensed signals via the function circuit, and sends the sensed signals or the modulated signals to the processing unit through the relay interface and the expansion interfaces.

14 Claims, 4 Drawing Sheets

(51) Int. Cl.
  *G16Y 40/20* (2020.01)
  *G16Y 40/35* (2020.01)
  *H04W 52/02* (2009.01)

(56) References Cited

U.S. PATENT DOCUMENTS

2021/0133607 A1* 5/2021 Stubbs .................... G06N 20/00
2024/0211205 A1* 6/2024 Woo ........................ G06F 3/167

* cited by examiner

ARTIFICIAL INTELLIGENCE OF THINGS (AIoT) DEVELOPMENT SYSTEM AND WEARABLE DEVICE HAVING THE SAME

CROSS-REFERENCE TO RELATED APPLICATIONS

This application claims the priority of Republic of China Patent Application No. 109121694 filed on Jun. 24, 2020, in the State Intellectual Property Office of the R.O.C., the disclosure of which is incorporated herein by reference.

BACKGROUND OF THE INVENTION

Field of the Invention

The present invention relates to artificial intelligence of things (AIoT) building technologies, and more particularly, to an AIoT development system with an expandable sensing function, and a wearable device having the AIoT development system.

Descriptions of the Related Art

Artificial Intelligence of Things (AIoT) is a network for allowing independent devices to be interconnected and communicate with each other, and allowing terminal devices (nodes) to be controlled, recognized and managed through a service platform. This makes AIoT spread throughout various areas, such as health medical WIT (Wise Information Technology), intelligent logistics transportation, smart home control, or factory automation control, and so on. By collecting data from the terminal devices at different locations, big data analysis (including edging computing and cloud computing) is performed, such that AI interconnection between things can be achieved and instant determination is executed so as to reduce any risk caused by human factors.

However, terminal devices (nodes) in AIoT should operate under specific network protocol to achieve interconnection between things. In order to connect all the terminal devices to AIoT, each of the terminal devices in a subnet must communicate with proxy equipment in a subnet communication language, and then the proxy equipment uses the subnet communication language to have mutual language translation with the specific network protocol, thereby making the proxy equipment play a very important role in AIoT hardware, for example, it should have computer computing power and AI recognition power. Also as AIoT interconnects things, when it is applied to certain areas, there is an issue of how to perform communication, computing, recognition or functional expansion between each of the terminal devices and the proxy equipment. For example, if it is to monitor a factory environment, such as monitoring various signals about factory equipment motor operation, factory equipment temperature, factory environmental humidity and so on, various sensors should be provided in the factory environment to sense different signals, and those sensors must comply with communication protocol between all hardware in the subnet; otherwise, either sensed signals fail to be transmitted, or AIoT operational architecture cannot be established. Further, if it is to alter the sensors or add more sensors in response to sensing requirements, AIoT subnet architecture must be rebuilt, thereby increasing difficulty in AIoT establishment. Moreover, each of the terminal devices must have microprocessor computing and AI functions to be able to instantly manage and process any signal from the sensors to mediate feedback processing.

Therefore, how to propose an AIoT development system for allowing functional change or expansion in response to AIoT building requirements to resolve the difficulty in AIoT subnet establishment, is an important task to work on in the art.

SUMMARY OF THE INVENTION

In view of the above drawbacks in the prior art, a primary object of the present invention is to provide an artificial intelligence of things (AIoT) building technology with desirable flexibility and integrity, which allows expansion of required function kits when needed and has signal recognition ability according to AI edge computing.

For the objects said above and for other objects, the invention provides an artificial intelligence of things (AIoT) development system, including: an auxiliary device including a first arithmetic unit and a first transmission receiving interface, wherein the first arithmetic unit has an AI edge computing processing function; a core including a processing unit, a second transmission receiving interface and a plurality of expansion elements, wherein the second transmission receiving interface is electrically connected to the processing unit and is for being connected to the first transmission receiving interface of the auxiliary device, and the expansion elements are electrically connected to the processing unit and are for performing signal transmission with an external device, wherein the processing unit has wireless transmission, programmable, computing and AI communication functions; and a plurality of function expansion kits, each of which includes: a relay interface connected to the expansion elements of the core, a transducer for sensing signals from a test object located at where a corresponding one of the function expansion kits is, and a function circuit for processing the signals sensed by the transducer, wherein the transducer of each of the function expansion kits senses signals, or modulates the sensed signals via the function circuit, and sends the sensed signals or the modulated signals to the processing unit through the relay interface and the expansion elements, wherein the processing unit processes the sensed signals or the modulated signals, and sends the processed signals to the first arithmetic unit through the second transmission receiving interface and the first transmission receiving interface, wherein the first arithmetic unit analyzes the received signals and feeds back control signals to the processing unit, allowing the processing unit to control each of the function expansion kits according to the control signals.

Preferably, the artificial intelligence of things development system said above, wherein the first transmission receiving interface and the second transmission receiving interface are respectively a connector and a socket, or the first transmission receiving interface and the second transmission receiving interface are respectively a socket and a connector. Moreover, the auxiliary device further includes: a power management unit acting as a power supply, for supplying power to the core through wired connection between the first transmission receiving interface and the second transmission receiving interface, so as to allow the core and the function expansion kits to gain power from the power management unit.

Preferably, the artificial intelligence of things development system said above, wherein each of the expansion elements includes a core repeater, and the relay interface of each of the function expansion kits has I/O ports serially connected to the core repeater, so as to allow the processing unit to flexibly select the function expansion kits to achieve AIoT application development.

Moreover, the artificial intelligence of things development system said above, the AIoT development system further includes information processing equipment, wherein the information processing equipment includes: a storage module for storing information data, a second arithmetic unit having an AI data computing processing function, a control module, a third transmission receiving interface, and a wireless transceiver module, wherein the information data stored in the storage module are set according to data required by performing sensing on the test object located at where a corresponding one of the function expansion kits is, and the processing unit sends the sensed signals or the modulated signals from the corresponding function expansion kit via wireless transmission to the wireless transceiver module of the information processing equipment, so as to allow the control module of the information processing equipment to store the sensed signals or the modulated signals in the storage module, and allow the control module to read the storage module to make the second arithmetic unit perform analysis and feed back recognition result signals to the processing unit through the control module and the wireless transceiver module, such that AI communication and control of the function expansion kits are accomplished.

Moreover, the invention further provides a wearable equipment, having the artificial intelligence of things development system said above, the wearable equipment including a container, and each of the auxiliary device, the core and the function expansion kits is composed of an integrated circuit or a circuit module, and allowing the auxiliary device, the core and the function expansion kits to be received in the container.

Compared to the prior art, the present invention provides an AIoT development system and a wearable device having the AIoT development system, which advantageously allow an AIoT developer to quickly develop an AIoT product that can be applied to various areas such as health medical WIT (Wise Information Technology), intelligent logistics transportation, smart home control or factory automation control, and so on, and desirably both product development time and cost can be reduced. Moreover, the present invention uses a core as a base for configuring required function expansion kits in a manner that, different sensing signals can be processed by different function expansion kits, such that according to development needs, the developer can flexibly select and assemble the required function expansion kits, like assembling "smart blocks", thereby making it easy to accomplish any design and idea from the developer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The above and other aspects, features and other advantages of the present invention will be more clearly understood from the following detailed description taken in conjunction with the accompanying drawings, in which:

The present invention provides an AIoT development system for collecting, processing, analyzing and recognizing signals sensed by a plurality of nodes, and for allowing other terminals to perform edge computing and cloud big data analysis, or allowing other terminals to feed back control signals for controlling operation of the plurality of nodes. Further, the AIoT development system of the present invention allows change and expansion of sensing items or functions according to requirements for signal collection.

Figure 1:
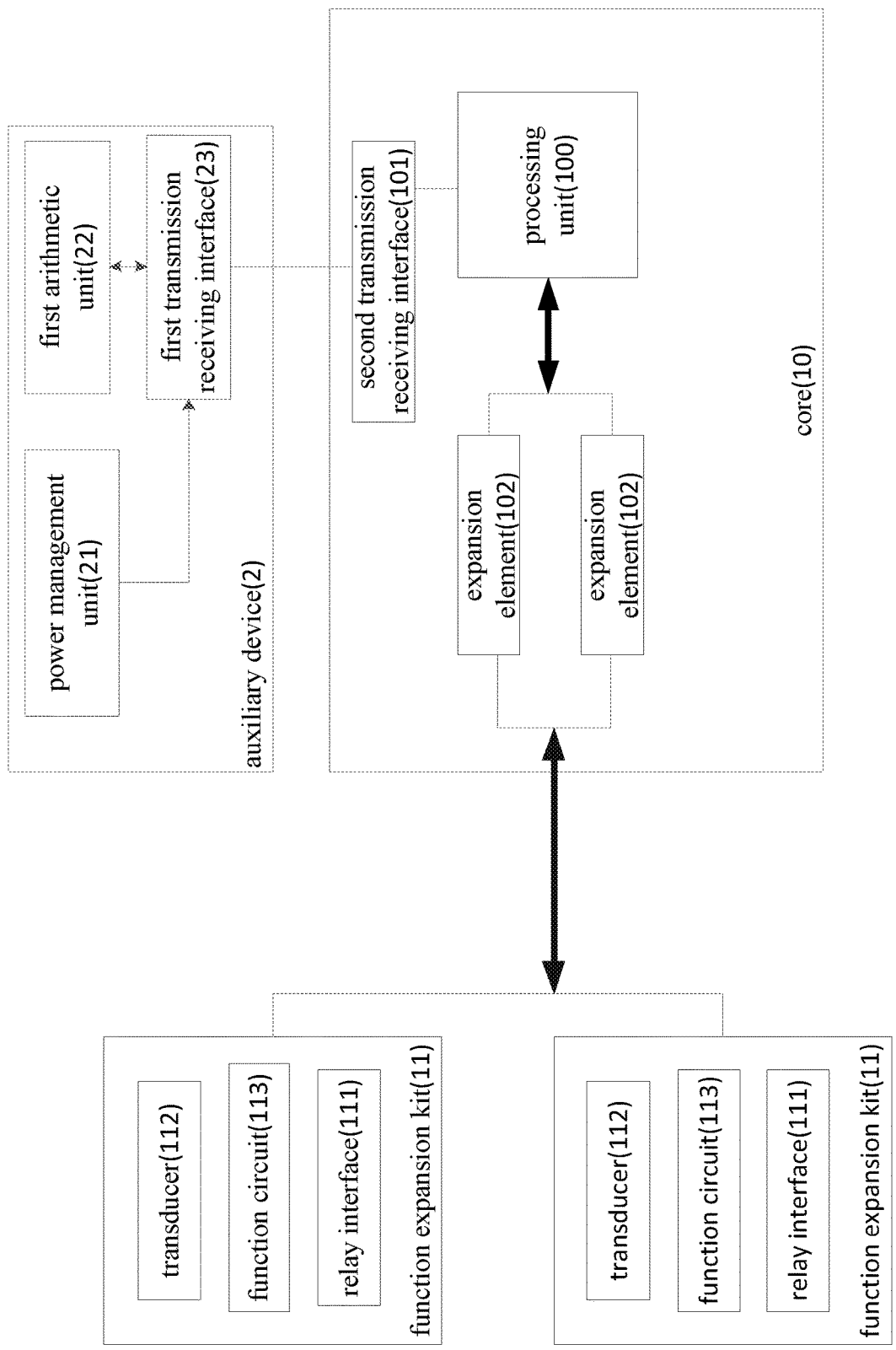
FIG. 1 is a basic system block diagram of an AIoT development system according to the present invention.
Figure 2:
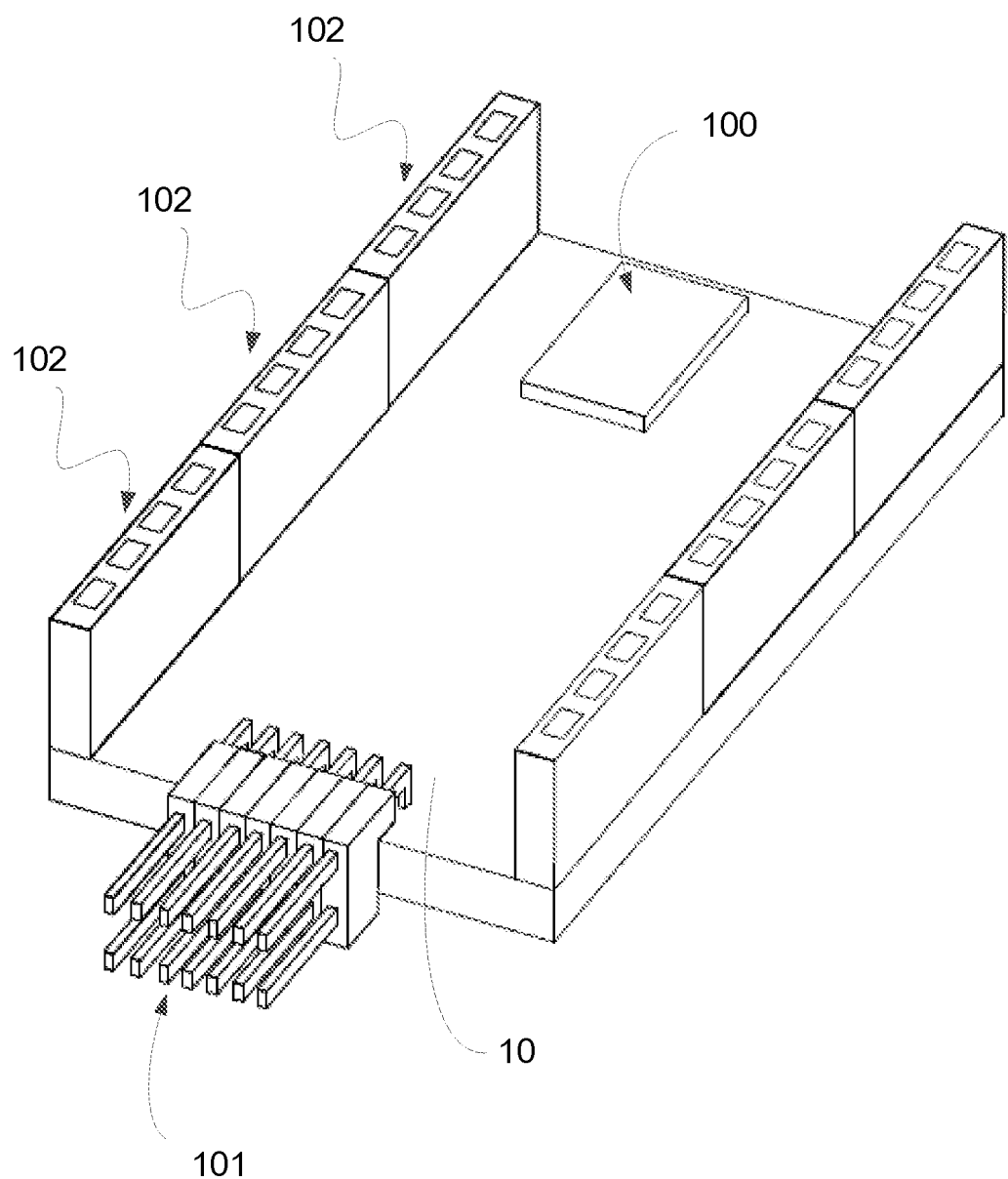
FIG. 2 is a schematic diagram of a core according to a preferred embodiment of the present invention.

FIG. 1 shows a basic system block diagram of the AIoT development system 1 according to the present invention. The AIoT development system 1 of the present invention includes a core 10, an auxiliary device 2, and one or more function expansion kits 11. The auxiliary device 2 includes a power management unit 21, a first arithmetic unit 22 and a first transmission receiving interface 23. The first arithmetic unit 22 has an AI edge computing processing function. The core 10 includes a processing unit 100, a second transmission receiving interface 101 and a plurality of expansion elements 102. The processing unit 100 has wireless transmission, programmable, computing and AI communication functions. The second transmission receiving interface 101 is electrically connected to the processing unit 100 and is for being connected to the first transmission receiving interface 23 of the auxiliary device 2, and the expansion elements 102 are electrically connected to the processing unit 100 and are for performing signal transmission with an external device. The core 10 can be, for example, a printed circuit board. The core 10 includes a second transmission receiving interface 101 that is a connector in this embodiment as shown in FIG. 2, while the number of the second transmission receiving interface 101 is not limited to one shown in FIG. 2 but can be plural. Alternatively, the second transmission receiving interface 101 can be a socket (not limited to connector), and is able to form wired connection with a first transmission receiving interface 23 of the auxiliary device 2. The second transmission receiving interface 101 can utilize a communication interface, such as UART, SPI, I2C, RS-XXX, IEEE 1394, DMX512, SDI-XX, SATA, HDMI, USB or PCI, to form the wired connection with the first transmission receiving interface 23 of the auxiliary device 2; or, other communication interfaces are also applicable to such wired connection. The auxiliary device 2 can be a data processing platform, smart card, computer equipment or electronic instrument (not shown here). Alternatively, the auxiliary device 2 can be an integrated circuit or a circuit module, such as Field Programmable Gate Array (FPGA), system-on-chip (SOC), wearable device, and so on.

The auxiliary device 2 further includes a power management unit 21 acting as a power supply, the power management unit 21 includes a battery or an energy retriever, which provides electric power to the core 10 by means of the wired connection between the first transmission receiving interface 23 and the second transmission receiving interface 101, such that the core 10 and the function expansion kits 11, which are connected to the core 10, gain power from the power management unit 21.

Figure 3:
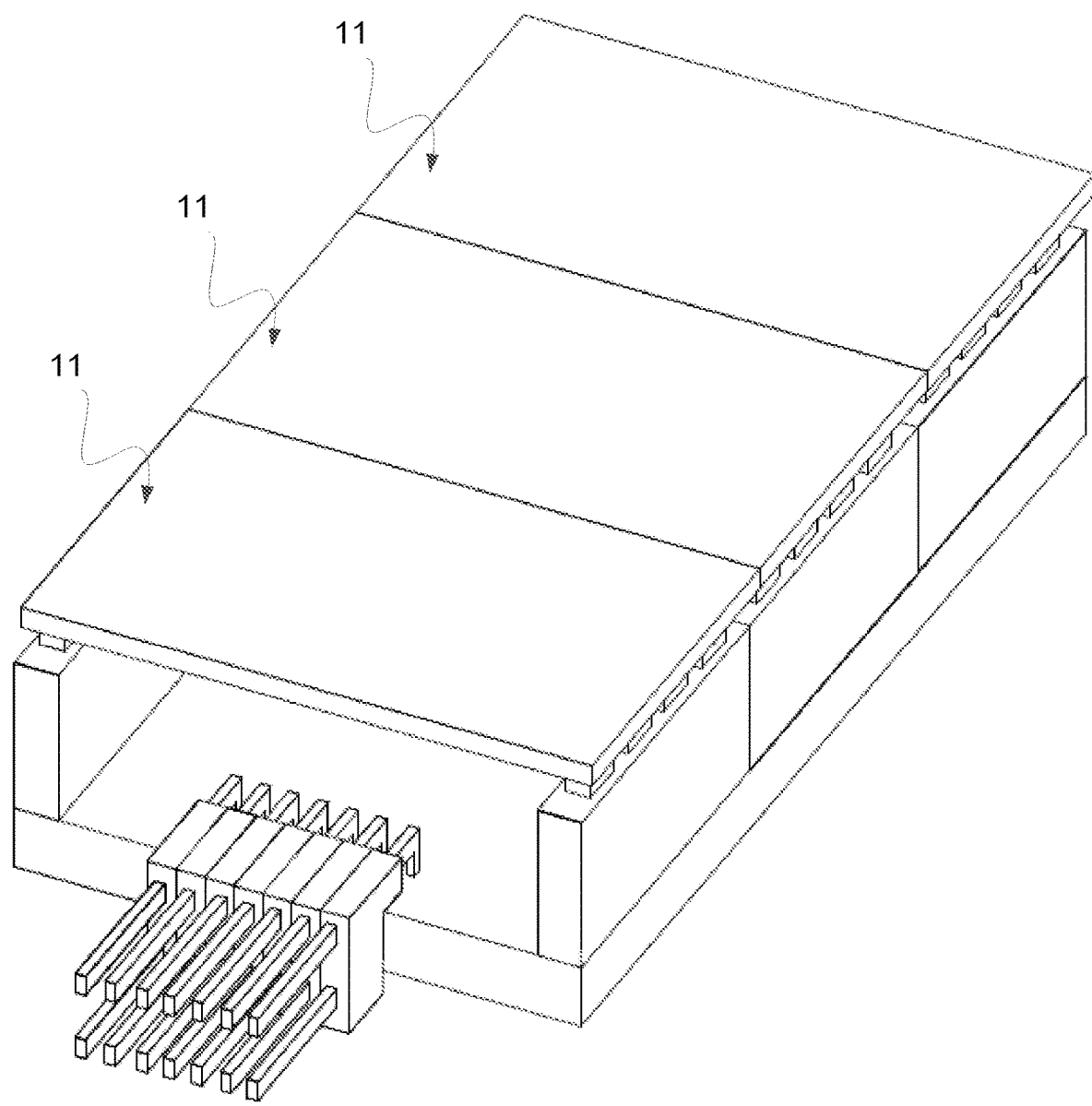
FIG. 3 is a schematic diagram showing the core coupled to a function expansion kit according to a preferred embodiment of the present invention.

Each of the function expansion kits 11 includes a relay interface 111 connected to all expansion elements 102 of the core 10, a transducer 112 for sensing signals from a test object located at where the corresponding function expansion kit 11 is, and a function circuit 113 for processing the signals sensed by the transducer 112. As shown in FIG. 3, there are three function expansion kits 11 in this embodiment. In the present invention, the number of the function expansion kits however can be more or less according to design requirements, and it is preferable that the function expansion kits 11 are detachably coupled to the AIoT development system 1, making assembly of the AIoT development system 1 and the function expansion kits 11 much more convenient, and thereby in favor of functional expansion or modification for the AIoT development system 1. Further, the core 10 is connected with the function expansion kits 11 in a building block assembly manner through the expansion elements 102. The transducer 112 of each of the function expansion kits 11 senses signals, or modulates the sensed signals via the function circuit 113, and sends the sensed signals or the modulated signals to a processing unit 100 of the core 10 through the relay interface 111 and the expansion elements 102. The processing unit 100 processes the sensed signals or the modulated signals, and sends the processed signals to a first arithmetic unit 22 of the auxiliary device 2 through the second transmission receiving interface 101 and the first transmission receiving interface 23. The first arithmetic unit 22 can immediately perform signal analysis and recognition for the corresponding function expansion kit 11, and feed back control signals to the processing unit 100, such that the processing unit 100 can control each of the function expansion kits 11 according to the corresponding control signals.

Here is an example for an application of the AIoT development system according to the present invention. If a factory environment is to be monitored, monitoring items can include monitoring various test parameters of factory equipment motor operation, factory equipment temperature or factory environmental humidity, etc., and can be performed by the function expansion kits 11. The function expansion kits 11 are located at a test factory, and test objects are factory motors, factory temperature and factory humidity. For different test objects, the transducers 112 of the function expansion kits 11 can be various sensors, such as vibration sensor, temperature sensor, humidity sensor and so on, for sensing different signals. The transducers 112 perform signal sensing via recognition elements, and can be, but not limited to, electrodes. It should be understood that, any sensor or transducer, which can obtain sensed signals from energy conversion of light, electricity, force, magnetism, heat, flow, inertia or acoustic wave, etc., can be used as the transducer in the present invention. Each of the function expansion kits 11 in this embodiment is substantially a single function kit implementing a single function. It is flexible to integrate various or multiple function kits to a chip or module, making a plurality of single-functioning kits able to achieve multiple functions.

The processing unit 100 of the core 10 is a control chip, which is a processing center of the AIoT development system 1 in the present invention. It can provide basic control functions and interact with the transducers 112 and the function circuits 113 of the function expansion kits 11 that are connected to the expansion elements 102, making the processing unit 100 integrate with the transducers 112 (with various application functions) and the function circuits 113 to form a multi-functional integrated chip or module. Each of the expansion elements 102 of the core 10 includes a core repeater connected to the processing unit 100, for transmitting electricity, control signals and data. More particularly, the core repeater can transmit electricity, control signals and data required for operation of each of the function expansion kits 11. The core repeater utilizes I/O ports to input and/or output electricity, control signals and data, and is coupled to the function expansion kits 11 so as to achieve functional expansion and transmit Internet information, such that interconnected communication network architecture can be established. The number of the I/O ports of the core repeater is adjustable (can be increased or reduced) in response to any modification of the Internet or functional requirements. This allows the processing unit 100 to flexibly select one or more of the function expansion kits 11 and thus is desirable for AIoT application development. Connection between the expansion elements 102 and the relay interfaces 111 should comply with data format and communication protocol of different sensor module interfaces, such as image transmission interface (MIPI), music digital interface (MIDI), light modulation interface (DMX 512), temperature and pressure interface (RS232/RS485/SPI), and other IO-Link communication protocol (for example, single-drop digital communication interface for small sensors and actuators (SDCI)). The connection is however not limited to such configuration; alternatively, sensor coupling and control can be directly achieved by simple transmitters and multiplexers.

Figure 4:
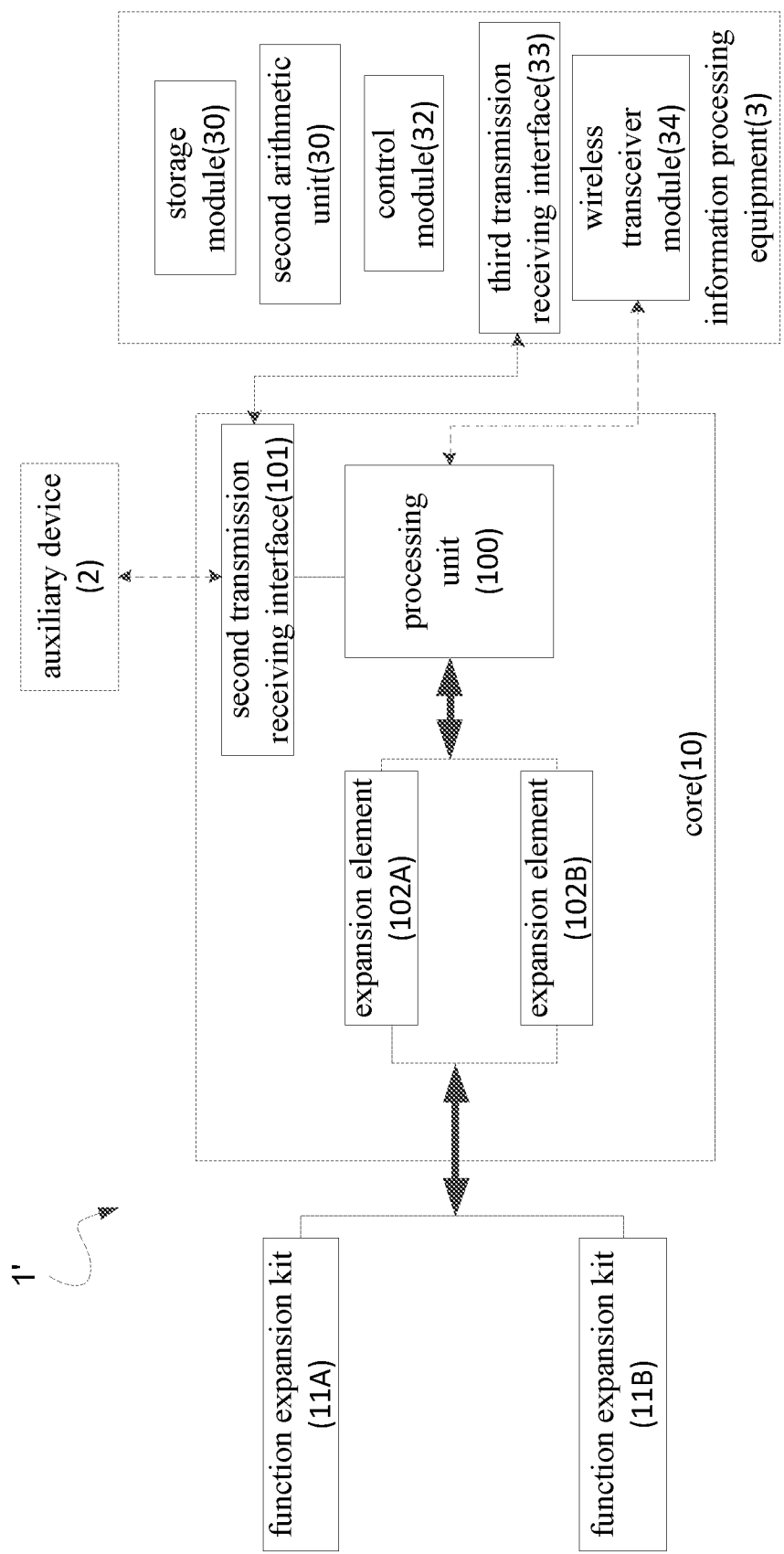
FIG. 4 is a basic architectural block diagram showing an AIoT development system of the present invention performing wireless transmission and AI processing with information processing equipment.

Refer to FIG. 4, which is a basic architectural block diagram showing an AIoT development system 1' of the present invention performing wireless transmission and AI processing with information processing equipment 3. The information processing equipment 3 can be a device having wired or wireless communication functions, such as computer, tablet, mobile phone, watch, or development platform providing single-chip development functions. The development platform is for example, FPGA, Raspberry Pi, Arduino, and development platform for IoT development version. The information processing equipment 3 at least includes: a storage module 30, a second arithmetic unit 31 having an AI data computing processing function, a control module 32 for performing coordination with the core 10, a third transmission receiving interface 33, and a wireless transceiver module 34. In this embodiment, the processing unit 100 of the core 10 further has a wireless communication function for performing wireless communication with the wireless transceiver module 34 of the information processing equipment 3. The storage module 30 is used to store information data which are set according to settings of the function expansion kits 11 of the AIoT development system 1. For example, if the function expansion kit 11 is a kit for providing temperature sensing service, the corresponding information data include temperature sensing feature data or raw data processed by the second arithmetic unit 31 having the AI data computing processing function, wherein the feature data are, for example, safe temperature range or abnormal temperature range, and the raw data are, for example, readings of temperature sensed by the transducer 112 of the function expansion kit 11. If the function expansion kit 11 is a kit for providing humidity sensing service, the corresponding information data include humidity sensing feature data or raw data processed by the second arithmetic unit 31 having the AI data computing processing function. This allows the control module 32 to read the information data stored in the storage module 30 and control the third transmission receiving interface 33 or the wireless transceiver module 34 according to the read information data to establish communication with the processing unit 100 of the core 10, such that the control module 32 can receive sensed or modulated signals that are outputted from the processing unit 100 of the core 10, or feed back control signals to the processing unit 100 of the core 10, so as to accomplish AI communication and control of the function expansion kits 11. Such an intelligent computing and intelligent control system builds up connection between things as well as establishes sensing, control, computing, analysis, feedback and correction mechanisms, thereby making AIoT further to be accomplished.

More particularly, taking FIG. 4 as an example, if a function expansion kit 11A connected to an expansion element 102A of the core 10 is a kit for providing motor vibration sensing service, and another function expansion kit 11B connected to another expansion element 102B of the core 10 is a motor feedback control kit, information data stored in the storage module 30 of the information processing equipment 3 can be motor vibration sensing data, which are feature data or raw data processed by the second arithmetic unit 31. Such information data can be used by the control module 32 to perform control, and fed back to the core 10 through the third transmission receiving interface 33 or the wireless transceiver module 34 so as to allow control of the function expansion kit 11B to be conducted (for example, controlling the motor feedback control kit). In the meantime, if there is any abnormality happened to the motor, it would cause change of vibration frequency, amplitude or phase, and then the information processing equipment 3 performs an analyzing diagnosis and can immediately notify an inspector and even can execute active feedback to control the motor and prevent unexpected motor stopping that might cause personal injury and heavy losses.

It should be noted that, the above wireless communication between the control module 32 and the processing unit 100 of the core 10 can be conducted via Bluetooth, WiFi, 3G/4G/5G or optical communication. Moreover, the wireless transceiver module 34 can be used for data transmission to an external smart device such as computer equipment, smart phone or smart platform so as to transmit data to a cloud system.

Therefore, from FIGS. 1 and 4, the AIoT development system of the present invention utilizes the auxiliary device 2 to perform edge computing to provide estimation processing to respond immediately. The AIoT development system of the present invention further can utilize the information processing equipment 3 to perform cloud big data analysis to realize complex calculations and meet deep learning needs. With such AI computing processing provided by the auxiliary device 2 and the information processing equipment 3, the AIoT development system of the present invention allows its entire sensing module and feedback control mechanism to be optimized by an iterative learning mechanism such as continuous sensing, control, computing, analysis, feedback and correction, such that self-correction and self-optimization can be achieved for realizing an AIoT situation.

It should be noted that, for the embodiment shown in FIG. 1 of the AIoT development system according to the present invention, the auxiliary device 2 has wired connection with the core 10, and the power management unit 21 of the auxiliary device 2 supplies power to the core 10 and the function expansion kits 11. Alternatively, the information processing equipment 3 can be the power supply. Particularly as shown in FIG. 4, the information processing equipment 3 can perform transmission communication with the core 10 in a wired or wireless way, wherein its wired transmission communication with the core 10 and the auxiliary device 2 can be accomplished by the second transmission receiving interface 101 (such as connector or socket). If there is only one connector or socket on the core 10, and the information processing equipment 3 is occupied, power of the core 10 is provided by the information processing equipment 3. If there are a plurality of connectors or sockets on the core 10, power can still partially be provided by the auxiliary device 2. In other words, power source of the core 10 is not limited to the auxiliary device 2 as shown in FIG. 1 but is flexibly adjusted according to practical implementation.

Moreover, the AIoT development system of the present invention is applicable to wearable equipment, that is, the present invention further provides a wearable device having the AIoT development system. The wearable device includes a container, and each of the auxiliary device 2, core 10 and function expansion kits 11 is composed of integrated circuit or module. Thus, the AIoT development system of the present invention can be minimized to allow the auxiliary device 2, core 10 and function expansion kits 11 to be received in the container. For example, the wearable device can be clothing, and the container can be a button or patch on the clothing; or, the wearable device can be watch, necklace, headphone, earring, hat, shoe, bag, belt, scarf or any wearable or portable accessory, and the container can be a jewelry on the accessory, such that a user can select a preferable look and form of wearable device. Here is more description for embodiments of the wearable device having the AIoT development system according to the present invention. The AIoT development system in this embodiment is a system for measuring physiological signals of a human body. The transducer of the function expansion kit of the AIoT development system can sense items including: ECG signals, EMG signals, temperature sensing signals, humidity sensing signals, breathing sensing signals, inertial sensing signals, etc. In order to measure various physiological signals of the human body, the wearable device having the AIoT development system in this embodiment is made in the form of smart clothing with the AIoT development system mounted on the clothing. Further, with the wireless communication function provided by the processing unit of the AIoT development system, the wearable device having the AIoT development system in this embodiment can perform wireless transmission and AI processing with the information processing equipment 3 shown in FIG. 4. For example, when the information processing equipment 3 communicates with the processing unit 100 of the core 10 via the wireless transceiver module 34, the wireless transceiver module 34 of the information processing equipment 3 receives physiological signals sensed by the transducers of the function expansion kits 11 from the processing unit 100 of the core 10, or the control module 32 of the information processing equipment 3 feeds back control signals to the function expansion kits 11 via the wireless transceiver module 34, so as to further control the function expansion kits 11, for example, providing stimulation signals such as voltage or current to adjust physiological conditions (such as to relieve pain), or providing a heating device to keep the body warm. This wearable device having the AIoT development system thus allows the user to have a convenient and comfortable health life due to its smart analysis and automatic feedback modulation mechanism.

The control module 32 of the information processing equipment 3 analyzes the physiological signals received by the third transmission receiving interface 33 or the wireless transceiver module 34 to check if they are abnormal, and/or retrieves and sorts features of the physiological signals, so as to send out an abnormality warning when the physiological signals are found abnormal, and to further send analysis results or raw data of the physiological signals to the cloud and/or medical institutions and even send them to predetermined mobile phones (for example, mobile phones of relatives and/or friends of a test person) to let them know the test person's physiological conditions. Moreover, the function expansion kits 11 can be controlled by the instant feedback mechanism to conduct the physiological adjustment or environmental control. Therefore, the wearable device having the AIoT development system according to the present invention is allowed to perform wireless transmission and AI processing with the above information processing equipment, that is, the wearable device having the AIoT development system of the present invention can perform big data analysis with cloud computing via the information processing equipment. It should be noted that, the wearable device having the AIoT development system of the present invention is not limited to wearable clothing, while the AIoT development system can be applied to an object attached to a building, such as lamp or alarm (and so on) mounted on the building, wherein the AIoT development system is used to sense a certain object to be sensed on the building, so as to assure safety of the building. The AIoT development system is also applicable in industrial control, for example, to an object attached to a motor, wherein temperature and vibration sensors are mounted around the motor, and the AIoT development system is used to sense a certain object to be sensed around the motor, so as to prevent industrial heavy losses caused by abnormality of the motor.

Therefore, the AIoT development system and the wearable device having the AIoT development system according to the present invention allow a user to configure required function expansion kits on a core of the AIoT development system depending on functional needs, such that it is flexible in choosing the required function expansion kits and coupling them to the core, making it convenient and easy to achieve functional expansion and modification. As the core is used as bridgeware for managing the required function expansion kits, the AIoT development system and the wearable equipment having the AIoT development system of the present invention desirably provides flexible and high-integrity AIoT application architecture.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. An artificial intelligence of things (AIoT) development system having a controller, including:
    an auxiliary device including a first arithmetic unit and a first transmission receiving interface, wherein the first arithmetic unit has an AI edge computing processing function;
    a core including a processing unit, a second transmission receiving interface and a plurality of expansion elements, wherein the second transmission receiving interface is electrically connected to the processing unit and is for being connected to the first transmission receiving interface of the auxiliary device, and the expansion elements are electrically connected to the processing unit and are for performing signal transmission with an external device, wherein the processing unit has wireless transmission, programmable, computing and AI communication functions; and
    a plurality of function expansion kits, each of which includes: a relay interface connected to the expansion elements of the core, a transducer for sensing signals from a test object located at where a corresponding one of the function expansion kits is, and a function circuit for processing the signals sensed by the transducer, wherein the transducer of each of the function expansion kits senses signals, or modulates the sensed signals via the function circuit, and sends the sensed signals or the modulated signals to the processing unit through the relay interface and the expansion elements, wherein the processing unit processes the sensed signals or the modulated signals, and sends the processed signals to the first arithmetic unit through the second transmission receiving interface and the first transmission receiving interface, wherein the first arithmetic unit analyzes the received signals and feeds back control signals to the processing unit, allowing the processing unit to control each of the function expansion kits according to the control signals, wherein the core is connected with the function expansion kits in a building block assembly manner through the expansion elements.

2. The AIoT development system according to claim 1, wherein the auxiliary device is a data processing platform, a smart card, a computer equipment or an electronic instrument.

3. The AIoT development system according to claim 1, wherein the first transmission receiving interface and the second transmission receiving interface are respectively a connector and a socket.

4. The AIoT development system according to claim 1, wherein the first transmission receiving interface and the second transmission receiving interface are respectively a socket and a connector.

5. The AIoT development system according to claim 1, wherein the auxiliary device further includes: a power management unit acting as a power supply, for supplying power to the core through wired connection between the first transmission receiving interface and the second transmission receiving interface, so as to allow the core and the function expansion kits to gain power from the power management unit.

6. The AIoT development system according to claim 5, wherein the power management unit includes a battery or an energy retriever.

7. The AIoT development system according to claim 1, wherein the auxiliary device is an integrated circuit or a circuit module.

8. The AIoT development system according to claim 1, wherein each of the expansion elements includes a core repeater, and the relay interface of each of the function expansion kits has I/O ports serially connected to the core repeater, so as to allow the processing unit to flexibly select the function expansion kits to achieve AIoT application development.

9. The AIoT development system according to claim 1, the AIoT development system further includes information processing equipment, wherein the information processing equipment includes: a storage module for storing information data, a second arithmetic unit having an AI data computing processing function, a control module, a third transmission receiving interface, and a wireless transceiver module, wherein the information data stored in the storage module are set according to data required by performing sensing on the test object located at where a corresponding one of the function expansion kits is, and the processing unit sends the sensed signals or the modulated signals from the corresponding function expansion kit via wireless transmission to the wireless transceiver module of the information processing equipment or via wired transmission to the third transmission receiving interface of the information processing equipment, so as to allow the control module of the information processing equipment to store the sensed signals or the modulated signals in the storage module, and allow the control module to read the storage module to make the second arithmetic unit perform analysis and feed back recognition result signals to the processing unit through the control module and the wireless transceiver module, such that AI communication and control of the function expansion kits are accomplished.

10. The AIoT development system according to claim 9, wherein the information processing equipment is a computer, a tablet, a mobile phone, a watch, or a development platform providing single-chip development functions.

11. The AIoT development system according to claim 10, wherein the development platform is FPGA, Raspberry Pi, Arduino, and development platform for IoT development version.

12. A wearable equipment, having an artificial intelligent of things (AIoT) development system, the wearable equipment including a container, and each of the auxiliary device, the core and the function expansion kits is composed of an integrated circuit or a circuit module, and allowing the auxiliary device, the core and the function expansion kits to be received in the container, wherein the AIoT development system having a controller, includes:
   an auxiliary device including a first arithmetic unit and a first transmission receiving interface, wherein the first arithmetic unit has an AI edge computing processing function;
   a core including a processing unit, a second transmission receiving interface and a plurality of expansion elements, wherein the second transmission receiving interface is electrically connected to the processing unit and is for being connected to the first transmission receiving interface of the auxiliary device, and the expansion elements are electrically connected to the processing unit and are for performing signal transmission with an external device, wherein the processing unit has wireless transmission, programmable, computing and AI communication functions; and
   a plurality of function expansion kits, each of which includes: a relay interface connected to the expansion elements of the core, a transducer for sensing signals from a test object located at where a corresponding one of the function expansion kits is, and a function circuit for processing the signals sensed by the transducer, wherein the transducer of each of the function expansion kits senses signals, or modulates the sensed signals via the function circuit, and sends the sensed signals or the modulated signals to the processing unit through the relay interface and the expansion elements, wherein the processing unit processes the sensed signals or the modulated signals, and sends the processed signals to the first arithmetic unit through the second transmission receiving interface and the first transmission receiving interface, wherein the first arithmetic unit analyzes the received signals and feeds back control signals to the processing unit, allowing the processing unit to control each of the function expansion kits according to the control signals, wherein the core is connected with the function expansion kits in a building block assembly manner through the expansion elements.

13. The wearable equipment according to claim 12, wherein the wearable device is clothing, and the container is a button or patch on the clothing.

14. The wearable equipment according to claim 12, wherein the AIoT development system further includes information processing equipment, wherein the information processing equipment includes: a storage module for storing information data, a second arithmetic unit having an AI data computing processing function, a control module for performing coordination with the core, a third transmission receiving interface, and a wireless transceiver module, wherein the information data stored in the storage module are set according to data required by performing sensing on the test object located at where a corresponding one of the function expansion kits is, and the processing unit sends the sensed signals or the modulated signals from the corresponding function expansion kit via wireless transmission to the wireless transceiver module of the information processing equipment, so as to allow the control module of the information processing equipment to store the sensed signals or the modulated signals in the storage module, and allow the control module to read the storage module to make the second arithmetic unit perform analysis and feed back recognition result signals to the processing unit of the core through the control module and the wireless transceiver module, such that AI communication and control of the function expansion kits are accomplished.

* * * * *